United States Patent [19]

Slobodyanik

[11] 4,065,528
[45] Dec. 27, 1977

[54] COLUMN APPARATUS FOR GAS-LIQUID HEAT AND MASS EXCHANGE PROCESSES

[76] Inventor: Ivan Petrovich Slobodyanik, ulitsa Gagarina, 87, kv. 15, Krasnodar, U.S.S.R.

[21] Appl. No.: 690,041

[22] Filed: May 25, 1976

[51] Int. Cl.$^2$ .............................................. B01F 3/04
[52] U.S. Cl. ................................. 261/114 R; 202/158
[58] Field of Search ................ 261/114 R, 114 JP, 97, 261/110, DIG. 44; 202/158

[56] References Cited

U.S. PATENT DOCUMENTS

| | | | |
|---|---|---|---|
| 1,899,409 | 2/1933 | Bottoms | 261/114 R |
| 2,651,512 | 9/1953 | Voleau | 261/114 R |
| 2,652,238 | 9/1953 | Manley | 261/114 R |
| 2,716,024 | 8/1955 | Dice | 261/114 R X |
| 2,804,935 | 9/1957 | Hutchinson | 261/114 R X |
| 3,338,566 | 8/1967 | Kittel | 261/114 R X |

FOREIGN PATENT DOCUMENTS 682,721  11/1952  United Kingdom ........... 261/114 JP Primary Examiner—Tim R. Miles
Assistant Examiner—Richard L. Chiesa
Attorney, Agent, or Firm—Haseltine, Lake & Waters

[57] ABSTRACT

A column apparatus for gas-liquid heat and mass exchange processes comprising contact plates arranged one above another, and provided with slots for the passage of gas therethrough. The contact plates are surrounded by annular pockets for discharging liquid flowing off the contact plates. The discharge of liquid from the annular pocket of an upper contact plate to the contact plate therebelow is effected through discharge pipes, the top ends of which are in communication with the annular pocket of the upper contact plate, the bottom ends thereof terminating slightly above the top surface of a solid center portion of the lower plate and being surrounded by two coaxial rings. These rings are also slightly above the top surface of the center portion of the contact plate in such a manner, that as the liquid is being discharged, there is formed a hydroseal without any stagnant areas.

5 Claims, 4 Drawing Figures

COLUMN APPARATUS FOR GAS-LIQUID HEAT AND MASS EXCHANGE PROCESSES

FIELD OF THE INVENTION

The present invention relates to column apparatus for gas-liquid heat and mass exchange processes, used as rectifying columns, absorption columns, washing towers and contacting columns, wherein a body of liquid moves downwardly through the vertically disposed column to come into contact with the gas rising within the column.

The proposed column apparatus is of particular advantage in the case of separation of mixtures which are either thermally unstable, tend to polymerize and contain solid substances, or tend to enter in undesirable chemical reactions, that is in those cases, wherein the time of residence of the body of liquid within the column must be short and wherein hydroseals used in said columns must be guarded against stagnant areas and prevented from being clogged with solid particles and polymerization products. The proposed column apparatus is also particularly useful for carrying out heat and mass exchange processes under very high liquid loads (extractive rectification).

PRIOR ART

Known in the art is a column apparatus for gas-liquid heat and mass exchange processes, comprising contact plates arranged in a casing one above another, which are embodied as a horizontal plate provided with slots for the passage of gas therethrough, wherein the direction in which gases emerge from the slots and in which the body of liquid moves over the adjacent plate is reversed, being alternately centrifugal (from the center towards the circumference) and centripetal (from the circumference towards the center), this to-and-fro movement being provided by guide vanes arranged above the slots, said guide vanes imparting the required flow direction to the gases rising within the column and passing through the slotted plates and driving the body of liquid moving from top downwardly and drawn alternately to the center of the contact plate and to the periphery thereof.

The contact plates are surrounded by annular circumferential pockets forming baffle elements. The pockets surrounding the contact plates with the centrifugal movement of liquid are used for discharging liquid, whereas the pockets arranged around the contact plates with the centripetally moving liquid are used for collecting the liquid flowing down from the contact plate thereabove. The means for discharging liquid from an upper contact plate with the centripetal direction of liquid flow onto the contact plate therebelow with the centrifugal direction of liquid flow comprises a central discharge pipe, connected at its upper end with a central discharge cylindrical element arranged on the upper contact plate, while the bottom end thereof extends into a central collecting cylindrical element arranged on the contact plate therebelow, said element being filled with liquid and providing for a hydroseal. The means for discharging the body of liquid from an upper contact plate with the centrifugal direction of liquid flow onto the contact plate therebelow with the centripetal direction of liquid flow comprises a circumferential annular discharge pipe, the top end of which is connected with the circumferential annular pocket of the lower contact plate, while the bottom end of said pipe extends into the circumferential annular pocket arranged on the contact plate therebelow, said pocket forming an element filled with liquid and providing for a hydroseal.

The known column apparatus allows for the use of high liquid and gas loads, ensuring at the same time intimate contact between phases, and high efficiency of heat and mass exchange between said phases. However, the known column apparatuses do not ensure uniform distribution of the body of liquid across the contact plates, said disadvantages naturally entailing non-uniform distribution of gas and sharply reducing the efficiency of the contact steps.

Besides, in the hydroseals of contact plates of the above-indicated column apparatus, there occur stagnant areas, which also lead to lower efficiency of mass exchange, as well as to polymerization of the separation products and clogging of the hydroseal elements with solid particles. The above disadvantages of the prior art column apparatus become ever more evident as the diameter of the column apparatus is increased. As a consequence, the above column apparatus failed to find extensive application in industry.

SUMMARY OF THE INVENTION

It is an object of the invention to provide a column apparatus for gas-liquid heat and mass exchange processes, ensuring uniform distribution of the body of liquid across contact plates and permitting a decrease in the height gradient of the liquid bed on a contact plate in a radial direction, which would promote, at the same time, uniform distribution of gases across the contact plate and improve the efficiency of mass exchange of the contact steps of the column apparatus.

Another object of the invention is to eliminate formation of stagnant areas in hydroseals of the discharge pipes and to provide for a flow of liquids through the system of hydroseals, to enable the solid particles and polymerization products of the separated mixtures to pass freely, thus preventing clogging of the systems of hydroseals.

These objects are attained in a column apparatus for gas-liquid heat and mass exchange processes, comprising contact plates arranged in a casing one above another, each of said plates being embodied as a horizontal plate having slots for the passage of gas therethrough, annular pocket forming elements arranged around the contact plates and used for collecting liquid flowing off from the contact plates, a system of discharge pipes for the discharge of liquid from the annular pockets of each of said plates onto the plate arranged therebelow, wherein, according to the invention, the lower ends of the discharge pipes of each system terminates slightly above the top surface of a solid center portion of the lower contact plate and are surrounded by two coaxially arranged rings which are also slightly above the center portion of the contact plate, and in being so arranged, the bottom edge of the inner ring extends below the bottom edge of the discharge pipes and below that of the outer ring, while the top edge of the inner ring terminates above the level of the bottom edge of the discharge pipes and below the level of the top edge of the outer ring, in such a manner that as liquid is being discharged, there is formed a hydroseal.

The hydroseal, which in the proposed column apparatus is formed by two coaxial rings surrounding the discharge pipes and arranged, like said discharge pipes, slightly above the solid center portion of the contact plate, permits the use of kinetic energy of the body of liquid to direct the liquid flow radially in relation to the contact plate as said liquid passes through said rings-to-plate gap, thus allowing the height gradient of the liquid bed to be reduced in a radial direction, which promotes uniform distribution of the flow of liquid across the contact plate, which, in turn also ensures uniform distribution of gases across the contact plate and increases the efficiency of a contact step.

This advantage of the continuous flow hydroseal is effective within a broad range of variations of liquid loads. Thus, at low liquid loads, the body of liquid flows off uniformly through the gap between the inner ring and the solid portion of the contact plate, while at high liquid loads, the body of liquid flows off through the gap between the inner ring and the top surface of the contact plate, over the upper edge of the inner ring, through the gap between the outer ring and the top surface of the contact plate, and also over the upper edge of the outer ring. At average liquid loads, the body of liquid flows off through the gap between the inner ring and the upper surface of the contact plate, over the upper edge of the inner ring, then through the gap between the outer ring and over the upper surface of the contact plate.

Thus, the uniform distribution of the body of liquid emerging from the continuous flow hydroseal is ensured all across the contact plate at various liquid loads.

Due to the fact that the proposed hydroseal is arranged in the center of the contact plate, the body of liquid on the contact plate moves in a centrifugal direction, and it is advisable to provide for the centrifugal flow of the body of liquid over all the contact plates in the apparatus according to the invention, which ensures continuous passage of liquids through the whole system of hydroseals of the apparatus.

Additionally, the free flow of liquid through the hydroseal prevents clogging thereof with solid particles and polymerization products, thus eliminating the formation of stagnant areas.

The above advantages ensure reliable operation of the contact steps of the column apparatus and improve the efficiency of mass exchange within a wide range of liquid and gas load variations under conditions of separating heat thermally unstable and polymerizable mixes.

BRIEF DESCRIPTION OF THE DRAWING

The invention will be now explained with reference to a specific embodiment thereof taken in conjunction with the accompanying drawings, wherein.

DETAILED DESCRIPTION

Figure 1:
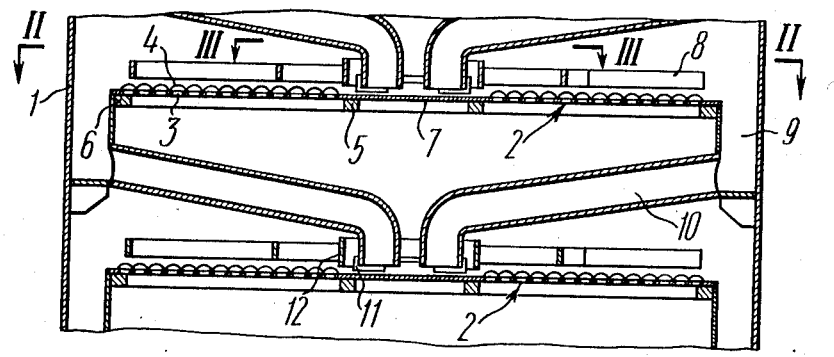
FIG. 1 is a cross-section view of a portion of a column apparatus with contact plates, according to the invention.

A column apparatus for gas-liquid heat and mass exchange processes comprises contact plates 2 arranged in a casing 1 (FIG. 1) one above another, each being embodied as a circular horizontal plate provided with slots 3 for the passage of gases therethrough. The edges of the slots 3 are provided with arcuate guide vanes 4 (FIGS. 1 and 2) arranged in such a manner, that the gas streams through the slots 3 have the same direction tangentially and are at an angle relative to the surface of the contact plate 2 imparting thereby a rotational movement to the body of liquid. For reasons of facilitating manufacture by stamping, it is advisable to arrange the slots 3 (FIG. 1) provided with arcuate vanes 4 on the circular disk of the plate along concentric circles, however said slots may be made by any other method and uniformly distributed across the horizontally arranged contact plate.

The contact plate may not have the guide vanes and may be embodied, for example, in the form of a mesh (not shown).

Figure 2:
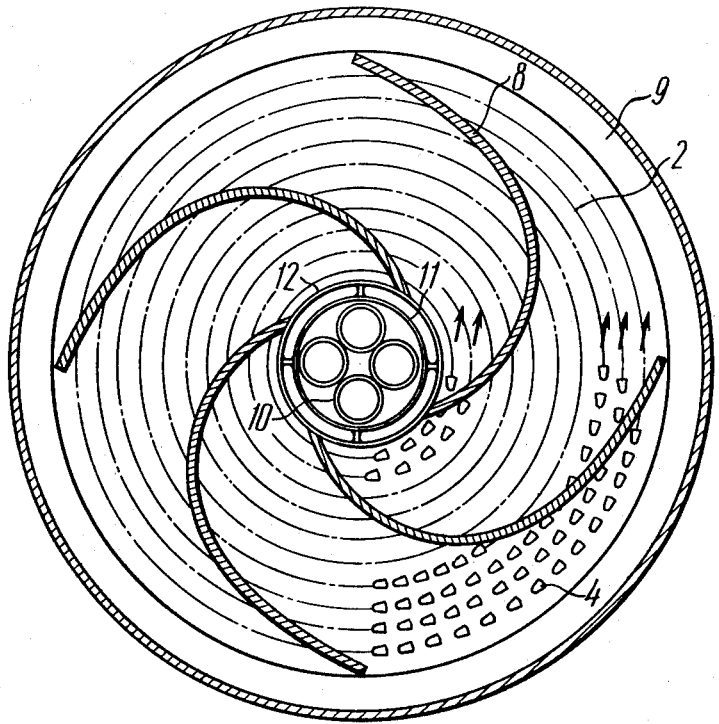
FIG. 2 is a view taken along line II—II in FIG. 1.

The contact plate 2 is fastened to supporting rings 5 and 6 (FIG. 1).

A central portion 7 of the body of the contact plate 2 is made solid, without the slots 3.

On the side of the contact plate 2, intended for collecting liquid, there are fastened baffle plates 8 (FIGS. 1, 2), coiled in the form of Archimedean spirals diverging from the center of the contact plate 2, each being twisted to the side corresponding to the direction of flow of gases imparted to said gases by the arcuate guide vanes 4 of the slots 3 (FIG. 1), and hence, corresponding to the direction of the rotating flow over the contact plate 2, providing for a more uniform distribution of the body of liquid over the surface of the contact plate 2.

The contact plates 2 arranged in the casing 1 are surrounded by annular pockets 9, which are fastened to the walls of the casing 1 and are intended for collection of liquid. Also fastened to the walls of the casing 1 are support beams (not shown) for fastening the contact plates 2 and the support rings 5 and 6. Discharge pipes 10 intended for discharging liquid from the annular pockets 9 of the upper contact plates 2 onto the center of the contact plates 2 arranged therebelow are rigidly fixed to the annular pockets 9, which are in communication with said discharge pipes 10.

Figure 3:
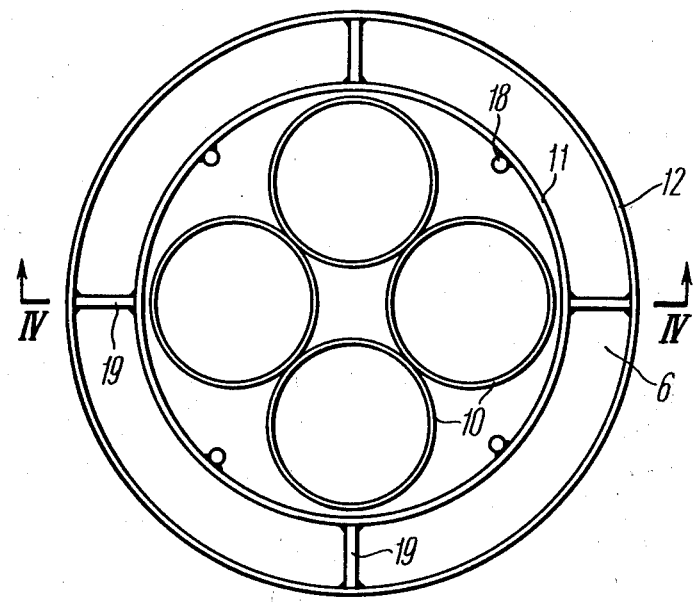
FIG. 3 is an enlarged view taken along line III—III in FIG. 1.
Figure 4:
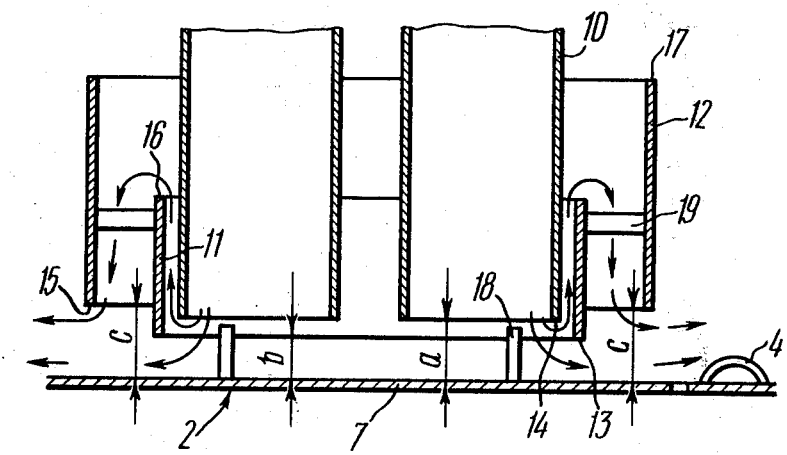
FIG. 4 is a view taken along line IV—IV of FIG. 3.

The lower ends of the discharge pipes 10 of each piping system intended for discharging liquid from one contact plate 2 onto another, are surrounded by two coaxially arranged rings 11 and 12 (FIGS. 1, 3) and terminate at a gap "$a$" (FIG. 4) above the solid center portion 7 of the contact plate 2.

A bottom edge 13 of the inner ring 11 extends below the level of a bottom edge 14 of the discharge pipes 10 and below the level of a bottom edge 15 of the outer ring 12, while a top edge 16 of the inner ring 11 is arranged above the level of the bottom edge 14 of the discharge pipes 10 and below a top edge 17 of the outer ring 12 in such a manner that as the liquid is being discharged through the discharge pipes 10, there is formed a continuous flow hydroseal, and as this takes place, while the whole of the body of liquid passes through the gap "$a$" between the discharge pipes 10 and the solid center portion 7 of the contact plate 2, only a part of the body of liquid flowing downward through the discharge pipes 10 passes through a gap "$b$" between the inner ring 11 and the center portion 7, whereas the quantity of liquid passing through a gap "$c$" between the outer ring 12 and the solid portion 7 exceeds that passing through the gap "$b$".

The inner ring 11 is fixed relative to the body of the contact plate 2 by means of rods 18, whereas the outer ring 12 is rigidly fixed to the inner ring 11 by rods 19.

The proposed column apparatus for gas-liquid heat and mass exchange processes operates as follows. Gas (or steam) entering the apparatus through the bottom, passes through the slots 3 (FIG. 1) in the contact plate 2 and contacts the body of liquid flowing through the discharge pipes 10 from the annular pocket 9 of the upper contact plate 2 onto the center of the contact plate 2 therebelow and filling the internal volume of the inner ring 11. A part of said liquid passes through the gap "b" (FIG. 4) between the inner ring 11 and the solid center portion 7 of the contact plate 2, while the rest of the body of liquid passes over the top edge 16 of the inner ring 11 into the space between the rings 11 and 12, and through the gap "c" between the outer ring 12 and the center portion 7 said liquid flows onto the contact plate 2 and on from the center of the plate towards the circumference thereof (the liquid flow is shown by arrows).

At high liquid loads, a part of the body of liquid flows over the upper edge 17 of the outer ring 12 from the space between the rings 11 and 12 onto the surface of the contact plate 2.

Thus, during operation, as the liquid is flowing downwards through the discharge pipes 10, the inner ring 11 is filled with liquid, the discharge pipes 10 being subsequently submerged therein, thus forming a hydroseal, and as this takes place, the free flow of liquid through said hydroseal prevents clogging thereof with solid particles and polymerization products. However, after the supply of liquid onto the contact plate 2 is cut off, the entire quantity of said liquid flows off the contact plate 2. Additionally, when the proposed column apparatus is in operation, the kinetic energy of the liquid flowing from the discharge pipes 10 is partially used to impart a higher speed to the liquid flowing over the surface of the contact plate 2 in the radial direction, the latter decreasing the height gradient of the layer of liquid on the contact plate 2 providing for a more uniform distribution of liquid and gases across the contact plate 2, said feature being known to result in increased mass exchange efficiency of the contact steps.

The absence of stagnant areas in the continuous flow hydroseal system is also conducive to an increase in the mass exchange efficiency as well as to shorter time of residence of the body of liquid within the apparatus, the latter factor being of particular importance when separating thermally unstable and polymerizable mixtures.

In addition to these advantages, elimination of stagnant areas in the apparatus and the shorter duration of residence of liquid within the apparatus provide for a more stabilized operation of the apparatus as a whole and for shorter transients, which further enhances the efficiency of the apparatus.

What is claimed is:

1. A column apparatus for gas-liquid heat and mass exchange processes, comprising: a casing; contact plates arranged in said casing one above another and each being constituted as a horizontal plate having a center solid portion and slots distributed over the rest of the plate area for the passage of gas therethrough; annular pocket forming means for collecting liquid flowing off said contact plates, fixed around said contact plates; discharge pipes for discharging liquid from each of said contact plates onto the contact plate therebelow; said discharge pipes having upper ends connected to said annular pocket forming means of said upper contact plate; said discharge plates having lower ends terminating slightly above said solid center portion of the lower contact plate; inner and outer spaced coaxial rings surrounding said lower ends of said discharge pipes, said rings being arranged in spaced relation above said solid center portion of the contact plate; said inner ring having a bottom edge extending below the level of the bottom edge of said discharge pipes and below the bottom edge of the outer ring, said inner ring having a top edge arranged above the level of said bottom edge of said discharge pipes and below the top edge of said outer ring, in such a manner that as the liquid is being discharged, there is formed a hydroseal.

2. A column apparatus as claimed in claim 1 wherein said top edge of the inner ring is above the bottom edge of the outer ring.

3. A column apparatus as claimed in claim 2 comprising means supporting said inner ring from the solid center portion of the lower plate and means supporting said outer ring from the inner ring.

4. A column apparatus as claimed in claim 3 comprising curved baffle plates on said plates extending from said outer ring towards the outer periphery of said plates.

5. A column apparatus as claimed in claim 4 wherein said plates are perforate outside said solid center portion.

* * * * *